Patented Mar. 6, 1951

2,544,273

UNITED STATES PATENT OFFICE 2,544,273

FERMENTATION ACTIVATION

Carl Shelley Miner, Jr., Winnetka, and Bernard Wolnak, Chicago, Ill., assignors to Sewerage Commission of the City of Milwaukee, Milwaukee, Wis., a corporation of Wisconsin No Drawing. Application January 21, 1949, Serial No. 72,093

24 Claims. (Cl. 195—37)

This invention relates to a fermentation medium and process and, more particularly, this invention relates to fermentation activation.

In industrial fermentation processes it is well known that the fermentation medium must contain various nutrients which will permit the growth of the microorganism involved in the process in order to obtain the desired yield of products from the fermentation process. Ordinarily, fermentation media contain ingredients which include: (1) a carbohydrate to supply energy for the growth of the fermenting microorganism and for conversion to the desired end products, (2) a nitrogen source which may be organic or inorganic in nature, and (3) a source of minerals, such as phosphates and compounds of iron, copper, potassium, sodium, etc. For example, these materials are present in varying amounts in the nutrient medium prepared from molasses for the commercial production of ethyl alcohol by yeast fermentation. Likewise they are present in the various types of grain mashes and malt worts fermented by yeast for the production of ethyl alcohol and in the grain or molasses mashes fermented by certain anaerobic bacteria for the production of acetone and butyl alcohol.

It has been proposed from time to time to add to fermentation media various types of materials for the purpose of activating or stimulating the fermentation process whereby better growth of the microorganism and higher yields of the desired end products may be obtained. For example, such additives as corn extract, steep water, fatty acid sodium salts, vitamins, yeast extracts, amino acids, various proteins, activated carbon, bran infusion and the like have been suggested as additives to a fermentation medium for the production of ethyl alcohol by yeast. Also various additives have been proposed in other kinds of fermentation processes for the stimulation of the growth of the microorganism involved in the fermentation. Generally speaking, however, none of these additives has been used commercially. The principal reason is that the proposed additives, to be effective, are required to be added in too large amounts to be commercially feasible. Also many of the previously proposed additives, while exhibiting a stimulating effect in a purely synthetic medium, are no longer effective when added to fermentation media employed in industrial operations, such as grain or molasses mashes. Another drawback with respect to these previously proposed additives is that their presence may result in the increase of growth of the microorganism in the fermenting medium but only at the expense of the end product desired. This is particularly true in ethyl alcohol fermentation by yeast wherein the presence of the proposed additives may increase the amount of yeast formed but only at the expense of the total yield of ethyl alcohol.

In carrying out industrial fermentation processes, the fermentation period is fairly well defined, depending upon the type of fermentation that is being carried out and depending upon other factors, such as those relating to inoculation and incubation. The art has been searching for means whereby the total fermentation time may be reduced without sacrificing the yield of the desired product so that the fermenter may be subjected to an increased number of complete fermentation cycles within a given period of time. For example, in the commercial fermentation of grain or molasses mashes by yeast to produce ethyl alcohol, the usual time of fermentation extends for about 48 hours. Obvious commercial advantages are obtainable if this time of fermentation can be substantially reduced.

Accordingly, one object of this invention is the provision of a fermentation medium suitable for industrial use in which the total time required for fermentation to be completed by a microorganism therein is markedly reduced.

A further object of this invention is the provision of a fermentation activator for use in industrial fermentations which will decrease the total fermentation time without adversely affecting the yield of desired product.

A still further object of this invention is the provision of a fermentation activator which in certain cases will actually increase the yield of desired product in the fermented liquor.

A still further object of this invention is the provision of a fermentation activator which is effective even though present in a fermentation medium in minute amounts.

A still further object of this invention is the provision of a fermentation process involving the use of an activator which functions to cut down the incubation period required in the fermentation cycle and at the same time functions to increase the total yield of the desired end product of the fermentation.

Further and additional objects will appear from the following description and the appended claims.

In accordance with this invention it has been discovered that a fermentation medium may be activated by adding thereto small quantities of a sludge resulting from the microbiological treatment of sewage or a hydrolysate of a sludge of this type. It has been found that a fermentation medium, normally comprising an aqueous dispersion of a fermentable carbohydrate and other substances necessary for the optimum growth of a fermentation microorganism, may be markedly improved by the addition thereto of a small amount of a sludge resulting from the microbiological treatment of sewage or an acid, alkaline or enzymatic hydrolysate thereof. In accordance with one embodiment of this invention, it is preferred to use the sludge in the dried form as it is presently available on the market. However, the sludge may be used in the undried form if desired or it may be subjected to an acid, alkaline or enzymatic hydrolysis step and the resulting water-soluble hydrolysate employed as the activator.

In accordance with a preferred embodiment of this invention, the sludge is of the type known as activated sludge. The addition of activated sludge in small amounts to various types of fermentation media, such as those prepared from pure sugar solutions, malt wort, molasses mash, grain mash and the like, will markedly reduce the time in which the fermentation will be completed therein. In addition it has been discovered that the activation does not take place at the expense of the desired end product of the fermentation. In fact, particularly in yeast fermentations, there is actually (in addition to reduction in time of fermentation) an increase in alcohol produced when the fermentation activator of this invention is employed.

Dried activated sludge is now available commercially and sold under the trade name "Milorganite." It is the product obtained from that type of sewage treatment and purification known in the art as the "activated sludge process." The commercial procedure for obtaining a dried form of activated sludge is somewhat as follows: Raw sewage, sanitary and industrial, is brought to a sewage-treating plant by an extensive system of sewers. The incoming raw sewage is passed through partial sedimentation tanks and screens to remove large particles of suspended mineral and organic matter. The screened sewage is then mixed with, for example, about 25 per cent by volume of undried, freshly produced activated sludge which latter serves as an inoculant. The resulting mixture, termed "mixed liquor," is then passed through large aeration tanks where it is agitated and aerated for four to six hours by a continuous stream of tiny air bubbles. The air bubbles are formed in the mixed liquor by passing washed and compressed air through porous plates in the bottom of the aeration tanks. During aeration the finely divided organic matter in the mixed liquor coagulates into large flocs which comprise essentially the bodies of bacteria, molds, yeasts and protozoa. The aerated mixed liquor is then passed into large settling tanks where the flocculated matter settles to the bottom as activated sludge. The supernatant liquid comprising water and harmless soluble substances, such as nitrates and sulfates, is discharged from the treating plant. A portion of this settled activated sludge (containing about 2 per cent by weight of solids) is used to inoculate fresh, incoming screened sewage as above described and the remaining sludge is treated with ferric chloride and filtered. The ferric chloride serves to speed the filtering operation. The filter cake containing about 80 to about 85 per cent moisture is dried to about 5 per cent moisture with artificial heat in large revolving driers. The resulting granular substance is screened to uniform particle size, bagged and sold under the trade name "Milorganite." To date the chief use of this product has been as a fertilizer.

While in the foregoing a more or less specific method has been indicated for the preparation of activated sludge, it will, of course, be apparent that the process may be deviated from whereby to produce the fermentation activator contemplated by this present invention. By the term "activated sludge" as used in this specification and in the appended claims is meant any substance which comprises essentially a mass of microorganisms that is formed by the aeration of inoculated sewage under conditions favoring microbial growth. The dried sludge material is substantially insoluble in water or in an aqueous fermentation medium to which the sludge is added in accordance with this invention.

As indicated above, activated sludge is a preferred fermentation activator in accordance with this invention. However, in its broader aspects, this invention contemplates the use of other types of sludges resulting from the microbiological treatment of sewage. For example, digested activated sludge or sedimented digested sludge may be employed. Digested activated sludge is the product formed by aerobically treating screened raw sewage, passing the thus treated material to a settling tank, allowing the solids to settle, drawing off the supernatant liquid, passing the settled solids to a closed vessel, and digesting the solids under anaerobic conditions. The solid material which remains after the anaerobic digestion is separated and may be dried. Sedimented digested sewage sludge is prepared by passing screened raw sewage to settling tanks and withdrawing the settled solid material to closed tanks wherein it is allowed to undergo an anaerobic digestion. The solid material remaining after the anaerobic digestion is separated and dried.

As in the case of activated sludge, both digested activated sludge and sedimented digested sludge are substantially insoluble in water and comprise essentially a mass of microorganisms that is formed in the microbiological treatment. These sludges may be incorporated into a fermentation medium in the wet or dry state or the acid, alkaline or enzymatic water-soluble hydrolysates thereof may be used.

It has been discovered in accordance with this invention that very small amounts of dried sludge resulting from the aerobic or anaerobic treatment of sewage will, when incorporated into a fermentation medium, reduce the total fermentation time required to a marked degree. Only very minute quantities of the sludge are required to obtain a measurable degree of activation. For example, considerable activation has been observed when dried activated sludge is added to a fermentation medium in amounts as little as .0001 per cent. In commercial practice the amount of dried sludge added to a fermentation medium will usually fall within the range of 0.001 and 1.000 per cent by weight, and preferably within the range of about 0.010 and 0.100 per cent by weight, depending upon the degree of activation desired, economic considerations and the specific type of fermentation process involved. If dried sludge is employed, it is preferred that it be finely divided so that substantially all of the particles will pass a 100 mesh screen.

A large number of types of industrial fermentation processes may be activated by sewage sludges in accordance with this invention. The activation has been found to be particularly noticeable in the yeast fermentation of molasses and grain mashes for the production of ethyl alcohol. However, the activator has application in a wide variety of other types of fermentations, such as the ethyl alcohol fermentation of lactose by yeasts of the genus Torula, the lactic acid fermentation by bacteria of the genus Lactobacillus and of the genus Streptococcus, yeast fermentation in the baking industry, the acetone-butyl alcohol fermentation, and in fact any industrial process involving the growth of microorganisms in large quantities in a nutrient medium for the production of various types of end products.

In order to demonstrate the advantages that are obtained in practicing this invention, a number of experiments are set forth in the following. It will be understood, of course, that this invention is not to be limited to the specific examples given in connection with these experiments but only by the scope of the appended claims.

EXPERIMENT 1

In order to test the efficacy of dried activated sludge as a fermentation activator, four fermentation flasks were prepared containing an aqueous medium of blackstrap molasses. The following procedure was employed for setting up and inoculating each fermentation flask of the series. Two hundred thirteen grams of blackstrap molasses of the type used commercially in the production of ethyl alcohol by fermentation and 0.4 gram of ammonium sulfate were dissolved in water and diluted to about 900 cc. The acidity of the solution was adjusted to a hydrogen-ion concentration corresponding to pH 4.9 with 1:1 sulfuric acid and the solution was then diluted to exactly 1000 cc. A 960 cc. aliquot of the resulting mash was transferred to a two liter fermentation flask and the remaining 40 cc. was placed in a small Erlenmeyer flask. Both the Erlenmeyer flask and the fermentation flask were plugged with cotton and were sterilized at 15 pounds' pressure for 20 minutes. Upon cooling of the flasks, a ½ gram portion of dried activated sludge (Milorganite) was added to each Erlenmeyer flask (except in the case of the control). Thereafter 2 cc. of a 50 cc. aqueous suspension of 0.5 gram of baker's yeast were used to inoculate the contents of each Erlenmeyer flask. The Erlenmeyer flask was fitted with a calcium chloride tube carrying a Bunsen valve and was incubated at 31° C. for 16 to 20 hours. After this period, the contents of each Erlenmeyer flask were transferred to the corresponding large fermentation flask which was also fitted with a calcium chloride tube and Bunsen valve. At the time of inoculation 4.5, 9.5 and 14.5 gram portions of Milorganite were added to three of the four fermentation flasks (again, excepting the control) so that the total amount of Milorganite in each fermentation flask at the beginning of the incubation period was 0, 5, 10 and 15 grams (0.0, 0.5, 1.0 and 1.5 per cent), respectively. The fermentation flasks were then incubated at 31° C. and the rate of fermentation was followed by determining the loss in weight due to the carbon dioxide evolved through the calcium chloride tube. This method has been used by a number of investigators in the fermentation field and has been found to be an accurate and rapid method for estimating the amount of ethyl alcohol produced since the weight of carbon dioxide liberated during fermentation is proportional to the weight of ethyl alcohol formed in the fermentation medium [cf. Thorne, Wallerstein Laboratories Communications 9, 97 (1946) and H. C. Schaefer, J. A. O. A. C. 30, 599 (1947)]. In this experiment and in the other experiments herein set forth, the losses in weight due to the liberation of carbon dioxide have been periodically checked by analysis of the fermentation medium for ethyl alcohol, and good correlation has consistently been obtained.

Thus a series of four fermentation flasks was set up wherein fermenter #1 contained no Milorganite, fermenter #2 contained 5 grams of Milorganite, and fermenters #3 and #4 contained 10 and 15 grams of Milorganite, respectively. The several fermentation flasks were weighed at 7, 12, 24, 31, 37, 48 and 72 hours in order to determine the loss in weight of the flasks which represents the amount of carbon dioxide evolved during fermentation. The results are set forth in Table I wherein the loss in weight at the several times is set forth on the basis of the per cent of the theoretical amount of carbon dioxide formed by the fermentation of the sugar present in the fermentation medium.

*Table I*

| Fermenter | Grams of Milorganite Added Per Liter | Per Cent of Theoretical $CO_2$ Evolved After— | | | | | | |
|---|---|---|---|---|---|---|---|---|
| | | 7 Hrs. | 12 Hrs. | 24 Hrs. | 31 Hrs. | 37 Hrs. | 48 Hrs. | 72 Hrs. |
| 1 (Control) | 0 | 2.6 | 22.0 | 57.4 | 70.5 | 78.0 | 84.5 | 86.2 |
| 2 | 5 | 12.3 | 38.4 | 68.8 | 79.6 | 83.0 | 84.7 | 85.5 |
| 3 | 10 | 12.9 | 41.0 | 74.6 | 84.0 | 84.7 | 86.0 | 86.8 |
| 4 | 15 | 13.4 | 41.5 | 77.7 | 86.2 | 87.8 | 89.0 | 90.5 |

It will be noted from an inspection of this table that the rate of fermentation was greatly accelerated in those fermenters to which Milorganite had been added, as compared to fermenter #1 to which no Milorganite had been added. Thus only after 7 hours following inoculation, between 12 and 14 per cent of the theoretical amount of carbon dioxide had been evolved in the fermenters containing the activated sludge, while only 2.6 per cent had been evolved from the control. Also it will be noted that the fermentations in the flasks containing the activated sludge were nearly complete in between 31 and 37 hours while the fermentation in the control was far from complete. In addition it will be noted that the total amount of carbon dioxide liberated from fermenter #4 was considerably higher than the control, indicating that increased amounts of ethyl alcohol had been formed.

Expressing the data given in Table I in another way, curves were drawn to determine the time it took the several fermentations there indicated to reach 83% of the theoretical conversion of sugar to useful fermentation products (i. e. ethyl alcohol measured as carbon dioxide liberated). These data are reported in Table II in which are indicated the fermenter numbers (corresponding to those noted in Table I), the grams of Milorganite added, and the hours at which 83% of the theoretical carbon dioxide had been evolved. When the results of this experiment are expressed in this fashion, it will be noted that with the control 45 hours were required before 83% of the carbon dioxide was liberated. With each of the samples containing added Milorganite, the time was reduced to 40, 31 and 28 hours, respectively. The advantages in this reduction of time in a commercial fermentation process are obvious.

*Table II*

| Fermenter | Grams of Milorganite Added Per Liter | Hours to Evolve 83% of Theoretical $CO_2$ |
|---|---|---|
| 1 (Control) | 0 | 45 |
| 2 | 5.0 | 40 |
| 3 | 10.0 | 31 |
| 4 | 15.0 | 28 |

EXPERIMENT 2

Another series of fermentation flasks was set up, inoculated and incubated in the same manner as discussed above in connection with Experiment 1, each flask (except the control) containing 20 grams (2%) of dried Milorganite of different particle size. As before, ½ gram of the dry Milorganite was added via the small sample in the corresponding Erlenmeyer flask employed for seeding the fermentation flask. The Milorganite added to each of the fermentation flasks varied only with respect to the particle size. Fermenter #1 was a control to which no Milorganite was added. Fermenter #2 contained particles of Milorganite, all of which were retained on an 80 mesh screen. The Milorganite added to fermenter #3 passed 80 mesh but was retained on 200 mesh, the Milorganite added to fermenter #4 passed 200 mesh but was retained on 275 mesh, the Milorganite added to fermenter #5 passed 275 mesh but was retained on 325 mesh, and the Milorganite added to fermenter #6 consisted of fines all of which passed 325 mesh. Table III indicates the time required for the evolution of 83% of the theoretical carbon dioxide from each of these fermenters, as well as the per cent of theoretical carbon dioxide evolved after fermentation for 48 hours.

*Table III*

| Fermenter | Grams per Liter and Particle Size of Milorganite Added | Hours to Evolve 83% of Theoretical $CO_2$ | Per Cent of Theoretical $CO_2$ Evolved After 48 Hours |
|---|---|---|---|
| 1 (Control) | 0 | 55–72 | 81 |
| 2 | 20 (on 80 mesh) | 33 | 83.5 |
| 3 | 20 (80–200 mesh) | 33 | 86 |
| 4 | 20 (200–275 mesh) | 23 | 92 |
| 5 | 20 (275–325 mesh) | 23 | 93.5 |
| 6 | 20 (passing 325 mesh) | 23 | 93 |

It will be noted that the Milorganite when added in amounts of 2% by weight of fermentation mash as in this experiment markedly reduces the time required for the fermentation to be carried out. Also this experiment demonstrates that increased amounts of carbon dioxide (hence increased yields of ethyl alcohol) are obtained when the Milorganite is used in the fermentation medium, particularly when the particle size of the added Milorganite is less than that corresponding to about 200 mesh.

EXPERIMENT 3

The two foregoing experiments clearly demonstrate that dried activated sludge (Milorganite) when added to a fermentation medium is very useful for decreasing the fermentation time and for increasing the yields of desired products. In order to demonstrate the advantageous results obtained when very small quantities of Milorganite are added, the following experiment was carried out. A series of nine fermentation flasks was set up, inoculated and incubated in the same manner as indicated above in connection with Experiments 1 and 2. No Milorganite was added to the first flask but varying amounts (all particles passing a 140 mesh screen) were added to the remaining flasks as indicated in Table IV. It will be seen that the amounts of Milorganite added varied from 0.001 to 0.500 gram per liter (0.0001 to 0.050%).

*Table IV*

| Fermenter | Grams of Milorganite Added Per Liter | Hours to Evolve 83% of Theoretical $CO_2$ | Per Cent of Theoretical $CO_2$ Evolved After 48 Hours |
|---|---|---|---|
| 1 (Control) | 0.000 | 49 | 82.8 |
| 2 | 0.001 | 41 | 83.8 |
| 3 | 0.010 | 37 | 84.5 |
| 4 | 0.050 | 32 | 86.5 |
| 5 | 0.100 | 31 | 86.5 |
| 6 | 0.200 | 30+ | 86.8 |
| 7 | 0.300 | 30+ | 85.4 |
| 8 | 0.400 | 30 | 86.1 |
| 9 | 0.500 | 30 | 85.8 |

It will be noted from a consideration of Table IV that the number of hours to evolve 83% of the theoretical carbon dioxide in the several fermentation flasks was very markedly reduced over the control fermenter even where the medium contained as little as 0.0001% Milorganite. Also the percent of theoretical carbon dioxide evolved after 48 hours was significantly greater, indicating a higher percentage of ethyl alcohol formed in each fermentation containing the activated sludge.

EXPERIMENT 4

In the foregoing experiments it has been demonstated that dried activated sludge serves as an activator in the fermentation of blackstrap molasses by baker's yeast. In order to demonstrate the usefulness of activated sludge in the ethyl alcohol fermentation of lactose by a yeast of the Torula genus, the following experiment was carried out. A culture medium was prepared by dissolving in tap water 50 grams of lactose, one gram of diammonium phosphate and one gram of monopotassium phosphate, and diluting to 500 cc. Fifty cubic centimeter aliquots of this medium were transferred to a series of 10 125 cc. Erlenmeyer flasks and sterilized. Each flask was inoculated with 2 cc. of a 24 hour culture of *Torula utilis* and incubated. Except for duplicate controls, various amounts of Milorganite were added to each of duplicate flasks in the series and the fermentations were followed as above by determining the loss in weight due to the carbon dioxide evolved. The results are indicated in Table V which summarizes the average of duplicate fermentations. The Milorganite employed in this particular experiment was a fine Milorganite, all of which passed a 150 mesh screen.

Table V

| Number | Grams of Milorganite Added Per 50 cc. | Per Cent of Theoretical CO₂ Evolved After— | | | | |
|---|---|---|---|---|---|---|
| | | 16 Hrs. | 24 Hrs. | 40 Hrs. | 48 Hrs. | 72 Hrs. |
| 1 (Control) | 0.00 | 3.8 | 8.0 | 25.3 | 33.6 | 54.2 |
| 2 | 0.10 | 7.0 | 15.3 | 34.8 | 42.7 | 61.8 |
| 3 | 0.25 | 8.1 | 19.8 | 42.0 | 50.4 | 67.1 |
| 4 | 0.50 | 19.1 | 38.1 | 70.8 | 78.6 | 79.4 |
| 5 | 1.00 | 26.0 | 51.0 | 74.8 | 79.4 | 80.6 |

This table expresses the average per cent of theoretical carbon dioxide lost from duplicate fermentation flasks after the several time intervals indicated. Activation is clearly evident. At the end of 72 hours the controls were still fermenting. Fermentation in each of the flasks containing 0.5 gram and 1.0 gram of Milorganite (1% and 2% respectively) was practically complete after 48 hours.

EXPERIMENT 5

In order to demonstrate the advantages resulting from the use of dried activated sludge in the ethyl alcohol fermentation of grain mash, the following experiment was carried out. One hundred grams of cornmeal were added to 500 cc. of water at 40° C. The mixture was then heated to 75° C. with stirring, after which ½ gram of ground diastatic malt was added. The resulting mixture was heated to 100° C., allowed to stand at this temperature for about 10 minutes, and then cooled to 75° C. Another ½ gram of malt was added and the mixture was cooled further. At 60° C. 20 grams of ground malt were added and the mixture maintained at 50° to 60° C. for 1½ hours. The mixture was then allowed to cool and stand overnight. To each of 50 cc. portions of this mash there was added ½ gram of diammonium phosphate and the acidity of each was adjusted to a hydrogen ion concentration corresponding to pH 5.0 with sulfuric acid. The mash was sterilized, cooled and inoculated in duplicate with ½ gram of baker's yeast. The fermentation flasks were incubated at 31.5° C. The duplicate controls (#1) contained no added Milorganite, while duplicate runs #2, #3 and #4 each contained 0.1, 0.5 and 1.0 gram (0.2, 1.0 and 2.0 per cent), respectively. The loss in weight due to evolved carbon dioxide was measured after 8 and 24 hours with the results indicated in Table VI, the losses in weight again being given as the averages of duplicate runs in each case.

Table VI

| Number | Grams of Milorganite Added Per 50 cc. | Loss in Weight Due to Evolved CO₂ After— | |
|---|---|---|---|
| | | 8 Hrs. | 24 Hrs. |
| | | Grams | Grams |
| 1 (Control) | 0 | 2.00 | 3.79 |
| 2 | 0.10 | 2.20 | 4.09 |
| 3 | 0.50 | 2.65 | 4.10 |
| 4 | 1.00 | 2.63 | 4.05 |

The results summarized in this table clearly show that the rate of fermentation of a grain mash is increased by the addition of dried activated sludge to the fermentation medium.

EXPERIMENT 6

In order to demonstrate the effect of dried activated sludge upon the fermentation of a simple dextrose substrate, the following experiment was carried out. Twenty-five grams of dextrose, one gram of diammonium phosphate and one gram of monopotassium phosphate were dissolved in water and diluted to 250 cc. After adjusting the acidity to a hydrogen ion concentration corresponding to pH 4.9, 50 cc. aliquots of the substrate were taken and to each were added the amounts of Milorganite indicated in Table VII. The flasks were then inoculated with 2 cc. of a suspension of one gram of baker's yeast in 100 cc. of water and incubated. The per cent of theoretical carbon dioxide lost was measured after 16, 24, 40, 48 and 72 hours and the results are summarized in Table VII.

Table VII

| Fermenter | Grams of Milorganite Added per 50 cc. | Per Cent of Theoretical CO₂ Evolved After— | | | | |
|---|---|---|---|---|---|---|
| | | 16 Hrs. | 24 Hrs. | 40 Hrs. | 48 Hrs. | 72 Hrs. |
| 0 (Control) | 0 | 3.4 | 9.1 | 23.7 | 25.2 | 76.7 |
| 1 | 0.10 | 22.0 | 41.7 | 66.2 | 76.0 | 80.6 |
| 2 | 0.25 | 30.1 | 51.0 | 76.0 | 78.8 | 80.0 |
| 3 | 0.50 | 48.4 | 76.7 | 81.3 | 82.6 | 84.0 |
| 4 | 1.00 | 58.6 | 77.8 | 81.0 | 82.0 | 82.0 |

Inspection of this table makes it evident that considerable activation was obtained by the addition of Milorganite even in the amount of 0.10 gram (0.2%).

EXPERIMENT 7

In order to demonstate the efficacy of dried activated sludge in the fermentation of carbohydrates to produce lactic acid, the following experiment was carried out. A fermentation medium was prepared by dissolving in water 200 grams of dextrose, 2 grams of yeast extract (Difco), one gram of Bacto-peptone and one gram of diammonium phosphate and diluting to 2,000 cc. with tap water. Fifty cubic centimeter aliquots of this medium were transferred to eighteen 125 cc. Erlenmeyer flasks and sterilized at 15 pounds' steam pressure for 30 minutes. Six ½ gram samples and six one gram samples of Milorganite (minus 150 mesh) were sterilized dry at 110° C. for three hours. The Erlenmeyer flasks containing the sterile media were divided into three groups of six each. The first group served as a control. To each Erlenmeyer flask of the second group was added a ½ gram sample of the sterilized Milorganite and to each Erlenmeyer flask of the third group was added a one gram sample of the sterilized Milorganite. Each of the 18 flasks was then inoculated with a 2 cc. portion of a 24 hour culture of Lactobacillus acidophilus and all were incubated at 37.5° C. At daily intervals a fermentation flask from each group was removed and analyzed for nonvolatile acid, which latter was taken to be lactic acid. The results are tabulated in Table VIII and show the nonvolatile acid (expressed in milligrams) present in each sample flask analyzed at the interval indicated.

Table VIII

| Group | Grams of Milorganite Added per 50 cc. | Milligrams of Nonvolatile Acid Formed After— | | | | | |
|---|---|---|---|---|---|---|---|
| | | 1 Day | 2 Days | 4 Days | 5 Days | 6 Days | 7 Days |
| 1 [1] | 0 | 124.3 | 896 | 1,599 | 2,297 | 2,478 | 2,836 |
| 2 | 0.50 | 165.8 | 1,276 | 2,333 | 3,152 | 3,497 | 3,688 |
| 3 | 1.00 | 195.8 | 1,479 | 2,680 | 3,258 | 3,688 | 3,721 |

[1] Control.

It will be noted here that the addition of Milorganite to the fermentation medium shows activation of the fermentation both with respect to the fermentation rate and with respect to the nonvolatile acids formed.

EXPERIMENT 8

The data given in the foregoing experiments have shown the effectiveness of activated sludge of the Milorganite type as a fermentation activator in several different types of fermentations. In order to demonstrate the effectiveness of other types of sludges resulting from the microbiological treatment of sewage and to compare such sludges with activated sludge, the following experiment was carried out.

The following solutions were first prepared:

Solution A

| | Grams |
|---|---|
| $KH_2PO_4$ | 40 |
| KCl | 17 |
| $MgSO_4.7H_2O$ | 5.0 |
| $CaCl_2.2H_2O$ | 5.0 |
| $MnSO_4.4H_2O$ | 0.10 |
| $FeSO_4.7H_2O$ | 0.10 |
| $(NH_4)_2SO_4$ | 100 |
| $(NH_4)_2HPO_4$ | 40 |
| $H_3BO_3$ | 0.020 |
| $ZnSO_4$ | 0.020 |
| $CuSO_4.5H_2O$ | 0.002 |
| KI | 0.002 |

The ingredients were dissolved in distilled water, the hydrogen ion concentration was adjusted to pH 5.0–5.2 with sulfuric acid, and the solution was diluted to 2000 cc. with distilled water.

Solution B

| | Milligrams |
|---|---|
| Thiamin (vitamin $B_1$) | 100 |
| Pyridoxine | 10 |
| Inositol | 100 |
| Nicotinic acid | 100 |
| Riboflavin | 100 |
| Asparagine | 100 |
| Aspartic acid | 200 |

The ingredients were dissolved in distilled water and diluted to 1200 cc.

Solution C

This solution was an acid hydrolysate of casein containing 10 grams of solids per 100 cc. of solution (obtained from General Biochemicals, Inc., of Chagrin Falls, Ohio).

The substrate was prepared using sucrose as the sugar source and employing the above solutions which contained salts and vitamins known to be necessary for producing the maximum rate of fermentation of the sugar by yeast. The substrate was the same in all the tests reported in this experiment. It was prepared by adding 50.0 grams sucrose, 100 cc. of Solution A, 50 cc. of Solution B and 40 cc. of Solution C to water, shaking to produce a homogeneous mixture, and diluting to 1000 cc.; 50 cc. aliquots of the final solution were placed in 250 cc. Erlenmeyer flasks fitted with $CaCl_2$ tubes carrying Bunsen valves. The dried sludges being tested were seived through a 150 mesh screen, and varying amounts were added to the aliquots (no additive in the control). The mixtures were then inoculated with 200 mg. of baker's yeast. The flasks were weighed and then incubated at $31.5 \pm 5°$ C. for six hours, after which they were again weighed to determine the amount of $CO_2$ evolved. The degree of activation was determined by calculating the $\Delta CO_2$ value, which is the increase in $CO_2$ evolved over that of the control. Figures are also given for the "per cent activation," which is the $\Delta CO_2$ value divided by the control value multiplied by 100.

Table IX shows the results of tests employing Milorganite (M 101) and sedimented digested sludge (Sed. Dig. S) and Table X shows the results of tests employing Milorganite (M 101) and digested activated sludge (M—Act. Dig.).

Table IX

| Sample | Additive | $CO_2$ Evolved | $\Delta CO_2$ | Activation |
|---|---|---|---|---|
| | Mg. | Mg. | Mg. | Per cent |
| 0 | 0 | 589 } [1] 580 | | |
| 0a | 0 | 572 } | | |
| 1 | 25 (Sed. Dig. S) | 693 | 113 | 19.5 |
| 2 | 50 (Sed. Dig. S) | 688 | 108 | 18.6 |
| 3 | 100 (Sed. Dig. S) | 697 | 117 | 20.2 |
| 4 | 200 (Sed. Dig. S) | 710 | 130 | 22.4 |
| 5 | 300 (Sed. Dig. S) | 737 | 157 | 27.1 |
| 6 | 500 (Sed. Dig. S) | 740 | 160 | 27.6 |
| 7 | 25 (M 101) | 707 | 127 | 21.9 |
| 8 | 50 (M 101) | 727 | 147 | 25.4 |
| 9 | 100 (M 101) | 753 | 173 | 29.8 |
| 10 | 200 (M 101) | 767 | 187 | 32.2 |
| 11 | 300 (M 101) | 794 | 214 | 36.9 |
| 12 | 500 (M 101) | 812 | 232 | 40.0 |

[1] Duplicate control average.

Table X

| Sample | Additive | $CO_2$ Evolved | $\Delta CO_2$ | Activation |
|---|---|---|---|---|
| | Mg. | Mg. | Mg. | Per cent |
| 0 | 0 | 493 } [1] 502 | | |
| 0a | 0 | 511 } | | |
| 1 | 25 (M—Act. Dig.) | 659 | 157 | 31.4 |
| 2 | 50 (M—Act. Dig.) | 671 | 169 | 33.8 |
| 3 | 100 (M—Act. Dig.) | 704 | 200 | 39.9 |
| 4 | 200 (M—Act. Dig.) | 677 | 175 | 35.0 |
| 5 | 300 (M—Act. Dig.) | 671 | 169 | 33.8 |
| 6 | 500 (M—Act. Dig.) | 720 | 218 | 43.5 |
| 7 | 25 (M 101) | 645 | 143 | 28.6 |
| 8 | 50 (M 101) | 650 | 148 | 29.6 |
| 9 | 100 (M 101) | 669 | 167 | 33.4 |
| 10 | 200 (M 101) | 708 | 206 | 41.1 |
| 11 | 300 (M 101) | 740 | 238 | 47.6 |
| 12 | 500 (M 101) | 862 | 360 | 71.8 |

[1] Duplicate control average.

The foregoing tables show the activation obtainable when a sedimented digested sludge and a digested activated sludge are employed. However, it will be noted that activated sludge (Milorganite) gave better activation than either of the others tested.

It will be apparent that the sludge may be used to advantage for activating various types of fermentation media and that various types of sludge may be employed. This invention is not to be confined to those fermentations specifically indicated in the foregoing since various other types of industrial fermentations may be activated thereby. For example, this invention may find application in the fermentation of carbohydrate-containing mashes by certain anaerobic bacteria to produce acetone and butyl alcohol, in the production of lactic acid by bacteria of the genus Lactobacillus and of the genus Streptococcus, in the production of citric acid by molds such as those of the genus Aspergillus, in the commercial propagation of yeast, in the bread industry, in the production of antibiotics such as penicillin and streptomycin, in the cheese and pickle industries, in the commercial propagation of root nodule bacteria of the genus Rhizobium, in the brewing, wine and distilling industries, etc. In fact, the fermentation activator of this invention may be employed in any fermentation medium wherein increased rates of fermentation and/or increased total yields of desired product are an important consideration. It is particularly useful in a fermentation medium which contains a source of carbohydrate as the energy-producing ingredient for the growth of the microorganism (bacteria, yeast or mold) involved in the fermentation. Generally, such media also include a suitable source of nitrogen (either organic or inorganic in nature) and mineral elements, such as combined phosphorus or potassium. As is well known, the desired mineral elements and suitable nitrogen sources may generally be found in such materials as molasses and grain.

Also, in the foregoing experiments, specific reference has only been made to the use of dried sludges for incorporation into the fermentation medium, this dried form being that in which it is presently commercially available. However, advantageous results in activation have been achieved when an undried form of activated sludge is employed. Thus, if desired, the undried filter cake from a sludge-producing process may be used as a fermentation activator. However, this undried material may present storage difficulties and it may, if incorporated into a fermentation medium in relatively large quantities, impart undesirable thick, viscous properties to the medium.

Also, as previously suggested, the acid, alkaline or enzymatic hydrolysates of the sludge product may be employed as a fermentation activator in accordance with one embodiment of this invention. A specific alkaline hydrolysate of activated sludge which was found to activate the fermentation of sucrose, malt wort and molasses substrates by baker's yeast to produce ethyl alcohol is one which was prepared as follows: In a five gallon reaction fitted with a stirrer and thermometer were placed 12 liters of water, 300 grams of hydrated lime and 30 grams of sodium hydroxide. This mixture was heated to 90° C. and there were added 2000 grams of Milorganite. The reaction was allowed to proceed at 90° to 95° C. for seven hours with stirring. The mixture was allowed to cool overnight and in the morning the acidity was adjusted to a hydrogen ion concentration corresponding to pH 6.3 with 150 cc. of concentrated sulfuric acid. The mixture was filtered and the resulting filtrate was evaporated to a specific gravity of 1.130. This alkaline hydrolysate concentrate was found to be an effective fermentation activator.

An acid hydrolysate also exhibiting activation in sucrose, malt wort and molasses substrates in fermentation by baker's yeast to produce ethyl alcohol was prepared as follows: Twenty five hundred cubic centimeters of water and 250 grams of concentrated sulfuric acid were placed in a 5 liter round bottom flask fitted with a stirrer, condenser and thermometer. After heating the mixture to 90° C., 300 grams of dried Milorganite were added rapidly. The reaction was allowed to proceed at 90° to 95° C. with stirring for 17 hours, after which 200 grams of hydrated lime were added to bring the hydrogen ion concentration to a value corresponding to pH 7.2. The insoluble solids and precipitated calcium sulfate were removed by filtration and the filtrate was evaporated as far as possible on a steam bath. It was then dried in an oven at 60° C. and then at 90° C. to produce a water-soluble solid residue.

Tests have been conducted employing small amounts of the acid hydrolysis product of activated sludge to determine its effect on yeast fermentation in the baking industry. It has been found that the dried sulfuric acid hydrolysate of Milorganite is an activator in this fermentation and the addition of 0.5% based on the weight of the flour reduces the necessary fermentation time from 6 hours (control sample) to 4 hours. As small an amount as 0.05% of acid hydrolysate produces significant activation.

Generally speaking, the hydrolysates of activated sludge are not preferred because of the expense involved in their preparation. However, they do have application in certain fermentation processes wherein the introduction of foreign solid matter into the fermentation medium would be objectionable, e. g. bread and cheese making.

The fermentation medium contemplated within the scope of this invention and the process for carrying out the fermentation will, in the light of the above discussion, be obvious to one skilled in the art. The fermentation medium may be prepared, pasteurized or sterilized, inoculated and incubated in the usual manner and the sludge product or its derivatives may be incorporated into the fermentation medium prior to or following sterilization or pasteurization. If desired, it may be added with the inoculation from the seed tanks.

The amounts of sludge or its derivatives that may be employed in commercial fermentations will vary widely depending upon the amount of activation desired, economic considerations and the type of fermentation. As indicated above, dried sludge itself is effective when incorporated into a fermentation medium in amounts as little as 0.0001%. In commercial practice the amounts of the dried product will usually fall within the range of 0.001% and 1.000%, and preferably within the range of 0.010% and 0.100%.

It is not presently understood why the sludge resulting from the microbiological treatment of sewage (or its derivatives) acts in the manner that it does to activate the fermentation process. Experiment 8 indicates that the activation is not due to the possible presence in the sludge of those vitamins which are now known to activate fermentation processes. Tests have been made which indicate that the mineral salts present therein do not account for the increased activation and also that any surface effects that may be produced by the dried product do not account for the beneficial results obtained. Inasmuch as the dried sludge is substantially insoluble in water, a full explanation of the markedly improved results cannot be given on the basis of the incorporation of additional food material into the substrate. This latter is obvious because the very small quantities of material that have been shown to be effective could hardly be expected to furnish enough additional nutrient to the microorganism to account for the increased fermentation rates and yield of desired products.

By the term "sludge" as used in this specification and in the appended claims is meant the mass of solid material resulting from the microbiological treatment of sewage whether said mass be in a raw, wet state, a semi-dried state, or a completely dried state, all as suggested in the foregoing description.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A fermentation medium comprising a fermentable carbohydrate and a composition selected from the group consisting of a sludge resulting from the microbiological treatment of sewage and a hydrolysate thereof.

2. A fermentation medium comprising a water dispersion of a fermentable carbohydrate and a quantity of a composition selected from the group consisting of a sludge resulting from the microbiological treatment of sewage and the hydrolysates thereof, said composition being present in an amount to increase the rate of fermentation in said medium when inoculated with a microorganism.

3. A fermentation medium comprising a water dispersion of a fermentable carbohydrate and a sludge resulting from the microbiological treatment of sewage.

4. A fermentation medium comprising a water dispersion of a fermentable carbohydrate and activated sludge.

5. A fermentation medium comprising a grain mash and activated sludge.

6. A fermentation medium comprising a water dispersion of molasses and activated sludge.

7. A fermentation medium comprising water, lactose and activated sludge.

8. An aqueous fermentation medium having dispersed therein a major proportion of a fermentable carbohydrate and a minor proportion of a fermentation activator selected from the group consisting of activated sludge and the hydrolysates thereof.

9. The fermentation medium recited in claim 8 wherein said fermentation activator is activated sludge and wherein the proportion of activator incorporated into the medium is in excess of about 0.0001% by weight.

10. A fermentation process which comprises cultivating a microorganism in a medium comprising a fermentable carbohydrate and a fermentation activator selected from the group consisting of a sludge resulting from the microbiological treatment of sewage and a hydrolysate thereof.

11. A fermentation process which comprises cultivating a microorganism in an aqueous medium comprising a fermentable carbohydrate and a fermentation activator comprising a sludge resulting from the microbiological treatment of sewage.

12. A fermentation process which comprises cultivating a microorganism in an aqueous medium comprising a fermentable carbohydrate and a fermentation activator comprising activated sludge.

13. The process recited in claim 12 wherein the fermentation activator is present in said medium in an amount greater than about 0.0001% by weight.

14. A fermentation process for the production of ethyl alcohol which comprises cultivating yeast in an aqueous medium comprising a fermentable carbohydrate and a small amount of a fermentation activator comprising activated sludge.

15. The process recited in claim 14 wherein said carbohydrate is molasses.

16. The process recited in claim 14 wherein said carbohydrate is a grain mash.

17. The process recited in claim 14 wherein said carbohydrate is lactose and wherein said yeast is a species of Torula.

18. A fermentation process for the production of lactic acid which comprises cultivating a lactic acid-producing microorganism in an aqueous medium comprising a fermentable carbohydrate and a fermentation activator comprising activated sludge.

19. The process recited in claim 18 wherein the microorganism is a bacteria of the genus Lactobacillus.

20. A fermentation medium comprising a water dispersion of a fermentable carbohydrate and a substantially water insoluble activated sludge having a particle size sufficiently small so that substantially all particles will pass through a 100 mesh screen.

21. The medium recited in claim 8 wherein said carbohydrate is a readily fermentable sugar.

22. A fermentation process which comprises cultivating a microorganism in a medium comprising a major proportion of a readily fermentable sugar and a minor proportion of a fermentation activator selected from the group consisting of a sludge resulting from the microbiological treatment of sewage and a hydrolysate thereof.

23. A fermentation process for the production of ethyl alcohol which comprises cultivating a yeast in an aqueous medium comprising a grain mash and 0.001 to 1.0 part by weight of a substantially water-insoluble activated sludge having a particle size sufficiently small so that substantially all particles will pass through a 100 mesh screen.

24. A fermentation process for the production of ethyl alcohol which comprises cultivating a yeast in an aqueous medium comprising molasses and 0.001 to 1.0 part by weight of a substantially water-insoluble activated sludge having a particle size sufficiently small so that substantially all particles will pass through a 100 mesh screen.

CARL SHELLEY MINER, Jr.
BERNARD WOLNAK.

(References on following page)

REFERENCES CITED

The following references are of record in the file of this patent:

UNITED STATES PATENTS

| Number | Name | Date |
|---|---|---|
| 1,020,306 | Ohlharer | Mar. 12, 1912 |
| 1,894,135 | Torok et al. | Jan. 10, 1933 |
| 1,963,581 | Heukelekian | June 19, 1934 |

FOREIGN PATENTS

| Number | Country | Date |
|---|---|---|
| 23,224 | Great Britain | of 1894 |
| 347,542 | Great Britain | of 1931 |